United States Patent [19]

Van Den Broek et al.

[11] Patent Number: 4,743,794

[45] Date of Patent: May 10, 1988

[54] CATHODE-RAY TUBE HAVING AN ION TRAP

[75] Inventors: Martinus H. L. M. Van Den Broek; Jan Zwier, both of Eindhoven, Netherlands

[73] Assignee: U.S. Philips Corporation, New York, N.Y.

[21] Appl. No.: 56,268

[22] Filed: May 26, 1987

Related U.S. Application Data

[63] Continuation of Ser. No. 793,884, Nov. 1, 1985, abandoned.

[30] Foreign Application Priority Data

Nov. 21, 1984 [NL] Netherlands .......................... 8403537

[51] Int. Cl.⁴ .............................................. H01S 29/74

[52] U.S. Cl. ..................................... 313/424; 313/445

[58] Field of Search ............... 313/424, 445, 449, 542, 313/373

[56] References Cited

U.S. PATENT DOCUMENTS

| | | | |
|---|---|---|---|
| 2,913,612 | 11/1959 | Swedlund | 313/76 |
| 4,259,678 | 3/1981 | van Gorkom et al. | 357/13 |
| 4,303,930 | 12/1981 | van Gorkom et al. | 357/13 |
| 4,486,687 | 12/1984 | Epsztein | 313/424 X |
| 4,506,284 | 3/1985 | Shannon | 357/52 |
| 4,516,146 | 5/1985 | Shannon et al. | 357/52 |

*Primary Examiner*—David K. Moore
*Assistant Examiner*—Sandra L. O'Shea
*Attorney, Agent, or Firm*—Robert J. Kraus

[57] ABSTRACT

Positive ions which are generated in a vacuum tube (1) and can adversely affect the electron emission of a cathode (3) are collected for the major part by a screen grid or diaphragm (5), which forms part of a positive electron lens (4,5). In the case of a semiconductor cathode having a circular emission region (13) having a diameter larger than that of the opening in the screen grid (5), this emission region (13) is struck only by positive ions generated in a small region between the cathode (3) and a first grid (4). These ions moreover have a comparatively low energy so that the emission behavior is to only a limited extent adversely affected by sputtering by positive ions which would remove cathode material (33), such as cesium.

4 Claims, 2 Drawing Sheets

CATHODE-RAY TUBE HAVING AN ION TRAP

This is a continuation of application Ser. No. 793,884 filed Nov. 1, 1985, now abandoned.

BACKGROUND OF THE INVENTION

The invention relates to an arrangement for recording or reproducing pictures comprising a cathode-ray tube having in an evacuated envelope a target plate and a cathode. This arrangement further includes means for forming a positive electron lens with the cathode, a first grid and a screen grid provided with an opening allowing the passage of electrons emitted by the cathode.

In an arrangement for recording pictures, the cathode-ray tube is a camera tube and the target plate is a photosensitive elements, such as a photoconducting layer. In an arrangement for reproducing pictures, the cathode-ray tube may be a picture tube, while the target plate comprises a layer or a pattern of lines or dots of a fluorescent material. Such an arrangement may also be designed for electron-lithographic or electron-microscopic applications.

Netherlands Patent Application No. 7905470 laid open to public inspection, and corresponding to U.S. Pat. No. 4,303,930, discloses a cathode-ray tube provided with a so-called "cold cathode". The operation of this cathode is based on the emanation of electrons from a semiconductor body in which a pn junction is operated in the reverse direction in such a manner that avalanche multiplication of charge carriers occurs. In this case, certain electrons can receive such an amount of kinetic energy as is required for exceeding the electron work function. These electrons are then released at the major surface of the semiconductor body and thus supply an electron current.

Since residual gases always remain in the evacuated envelope, negative and positive ions are released by the electron current from these residual gases. The negative ions are accelerated towards the target plate. In the case of electrostatic deflection, they can strike a small region of the target plate and damage the latter or adversely affect its operation. In order to prevent this harmful effect, ion traps are used. An ion trap for negative ions is known, for example, from U.S. Pat. No. 2,913,612.

Some of the positive ions move, under the influence of accelerating and focusing fields prevailing in the tube toward the cathode. If no special steps are taken, a number of these positive ions will strike the semiconductor and damage it. This damage may be a gradual removal by sputtering of a layer of material reducing the electron work function, such as, for example, cesium, which may be present. When this material is redistributed or even disappears completely, the emission properties of the cathode are changed. If this layer is not present (or is removed completely by the aforementioned sputtering mechanism), even the major surface of the semiconductor body may be attacked. In the case of a semiconductor cathode which utilizes avalanche multiplication of charge carriers such as the cathode described in Netherlands Patent Application No. 7905470, in which the emitting pn junction extends parallel to the major surface and is separated therefrom by an n-type surface zone, it is possible that due to this gradual sputtering this surface zone disappears completely so that the cathode is no longer operative. In a similar type of cold cathode as described in Netherlands Patent Application No. 7800987 in the name of the Applicant laid open to public inspection on 31 July 1979, and corresponding to U.S. Pat. No. 4,259,678, the pn junction is exposed at the major surface of the semiconductor body. Due to the damaging effect described above of positive ions present in the electron tube, for example the area at which the pn junction is exposed at the major surface may change. This leads to an unstable emission behaviour.

In the second type of cathode-ray tube, in which a pn junction is operated in the forward direction in the semiconductor cathode (the socalled negative electron affinity cathode or NEA cathode), the emission behaviour is also influenced due to the fact that sputtering takes place again. Also in this case, the layer of material reducing the electron work function is first gradually removed by sputtering. Subsequently, the n-type surface zone of the cathode is attacked until the cathode is no longer operative. Similar problems apply to other semiconductor cathodes, such as, for example, the semiconductor cathodes described in British Patent Applications No. 813359 (corresponding to U.S. Pat. No. 4,516,146) and No. 8133502 (corresponding to U.S. Pat. No. 4,506,284).

It is found that due to the aforementioned processes, the life of cathode-ray tubes manufactured with such semiconductor cathodes is considerably shortened.

SUMMARY OF THE INVENTION

The invention has for its object to provide an arrangement of the kind mentioned in the opening paragraph, in which these disadvantages are eliminated entirely or in part in that the positive ions are collected for the major part by the screen grid.

An arrangement according to the invention is characterized for this purpose in that, the cathode comprises a semiconductor body having at a major surface at least one electron-emitting region which, viewed in projection along the axis of the cathode-ray tube, is located outside the opening in the screen grid, and in that the opening in the screen grid is smaller than the opening in the first grid.

The invention is based on the recognition of the fact that due to this measure only a small number of the positive ions generated in the tube part beyond the screen grid strike the cathode. It is further based on the recognition of the fact that in semiconductor cathodes having a suitably chosen geometry of the emitting part the ions passed by the screen grid do not strike this emitting part, while only a fraction of the ions generated between cathode and screen grid, which moreover have a low energy, contributes to the sputtering effect. In such an embodiment, the influence of high-energy ions which are generated beyond the electron lens is practically entirely negligible.

Such a semiconductor cathode can moreover be advantageously manufactured in such a manner that the electrons are emitted practically from a circular crossover with a small spread round a given angle, which is advantageous from an electron-optical point of view. Due to the fact that the electrons now move effectively along the surface of a cone, the electronic brightness is reduced to a lesser extent by lenses having spherical aberration.

Preferably, a semiconductor cathode is used to this end of the kind described in the Netherlands Patent Application No. 7905470, but other semiconductor cathodes, such as, for example, NEA cathodes or the cathodes described in the Netherlands Patent Application No. 7800987 or in British Patent Application No. 8133501 and No. 8133502 are also possible.

BRIEF DESCRIPTION OF THE DRAWING

The invention will now be described more fully with reference to an embodiment and the drawing, in which.

Figure 1:
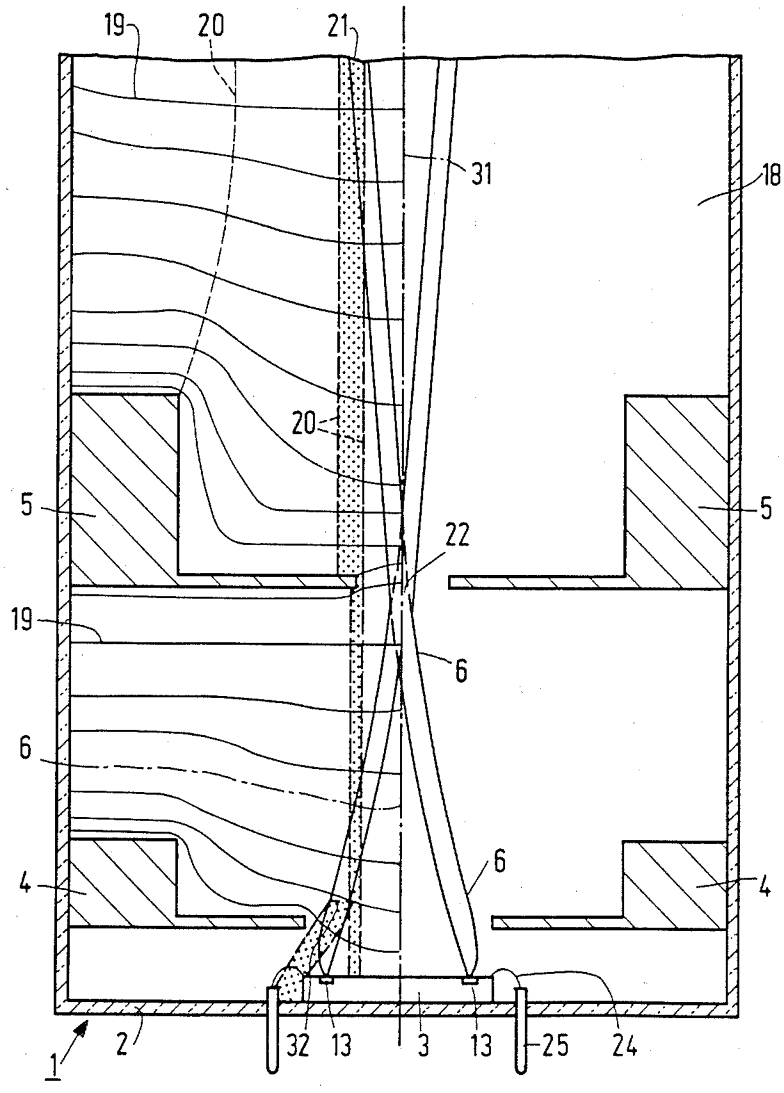
FIG. 1 shows diagrammatically a part of an arrangement according to the invention.

The Figures are not drawn to scale, while for the sake of clarity the cross-section and more particularly the dimensions in the direction of thickness are greatly exaggerated. Semiconductor zones of the same conductivity type are generally cross-hatched in the same direction; in the Figures corresponding parts are generally designated by the same reference numerals.

FIG. 1 shows a part of a cathode-ray tube 1 having in an evacuated envelope 2 a cathode 3, in this example a semiconductor cathode, in which emission of electrons is obtained by means of avalanche multiplication of electrons in a reverse biased pn junction. The cathode-ray tube further comprises a grid 4 and a screen grid 5, which, if connected to the correct voltages, form a positive lens from an electron-optical point of view. The part not shown of the cathode-ray tube 1 is provided with a target plate, while moreover the usual means may be used to deflect an electron beam 6 produced in the cathode 3. The electron-emitting regions are indicated diagrammatically in FIG. 1 by reference numerals 13.

In the semiconductor cathode 3, in this embodiment electrons are generated according to an annular pattern. For this purpose, the cathode 3 comprises a semiconductor body 7 (cf. FIG. 2) having a p-type substrate 8 of silicon in which an n-type region 9, 10 is formed, which consists of a deep diffusion zone 9 and a thin n-type layer 10 at the area of the actual emission region. In order to reduce in this region the breakdown of the pn junction between the p-type substrate 8 and the n-type region 9, 10, the acceptor concentration in the substrate is locally increased by means of a p-type region 11 formed by ion implantation. Electron emission therefore takes place inside the annular zone 13 which is left free by the insulating layer 12 and in which the electron-emitting surface is moreover provided with a monoatomic layer of material 33 reducing the electron work function, such as cesium. An electrode 14 may be provided on this insulating layer 12 of, for example, silicon oxide in order to deflect the emanated electrons; such an electrode may also serve to protect the underlying semiconductor body from charge effects which may occur when it is struck by positive ions or deflected electrons. The substrate 8 is contacted, for example, by means of a highly doped p-type zone 16 and a metallization 17, while the n-type region is connected via a contact metallization not shown. The regions to be contacted are connected in the mounted state (cf. FIG. 1), for example, via connection wires 24 to leadthrough members 25 in the wall 2. For a more detailed description of the semiconductor cathode 3, reference may be made to the Netherlands Patent Application No. 7905470.

The electrons generated by the cathode 3 are accelerated in the positive electron lens constituted by the grids 4 and 5. Due to the fact that during operation the grid 4 has a low or even negative voltage and the screen grid 5 (diaphragm) has a positive voltage, these grids and cathode form, from an electron-optical point of view, a positive lens which causes the annular electron beam generated in the zone 13 to converge in a cross-over 22. This cross-over, which is situated approximately at the area of the opening in the screen grid 5 (diaphragm), acts as a real source for the actual electron beam, which is then deflected, for example by electromagnetic means.

The cross-over 22 has a certain dimension at the area of the opening in the screen grid 5. This dimension determines the minimum diameter of the opening in the screen grid 5, while the maximum diameter is determined by the inner diameter of the annular region 13, in which electron emission takes place, the latter diameter being in this embodiment about 200/μm.

In the present embodiment, the grid 4 is operated at a voltage of 0 V, while a voltage of 265 V is applied to the screen grid 5. The cross-over 22 has a diameter of 40 to 5/μm. For the opening in the screen grid 5 a diameter is chosen of, for example, 100/μm.

Figure 2:
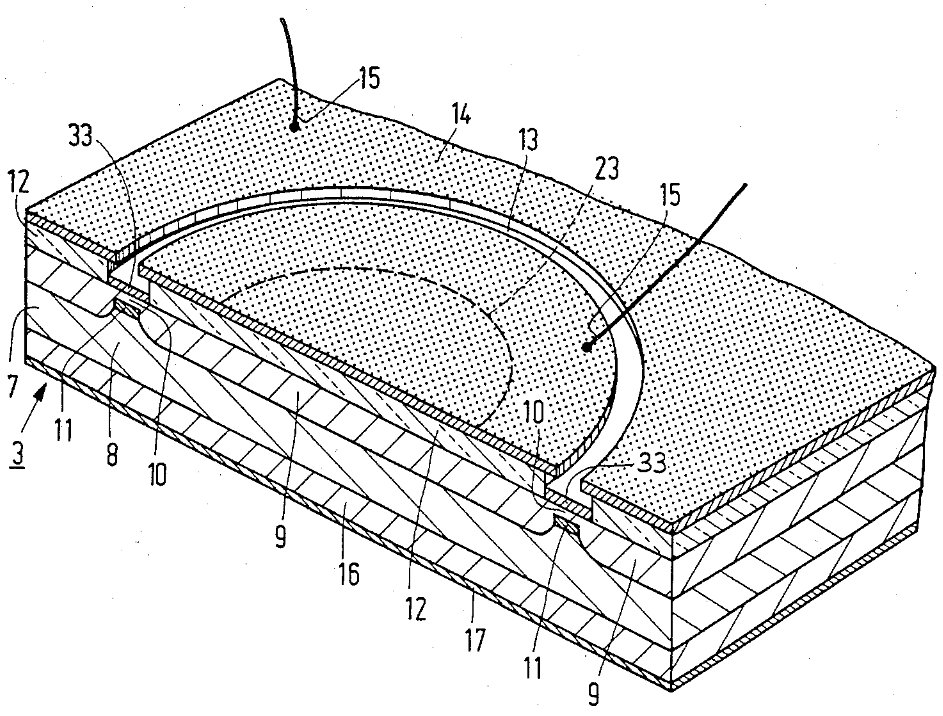
FIG. 2 shows partly in cross-section and partly in plan view a semiconductor cathode for use in such an arrangement.

If, due to the collision of electrons or for any other reason, positive ions are generated in the vacuum tube 2, the latter are accelerated towards the cathode 3. Most of the positive ions are generated in the part 18 of the tube 2 and are accelerated along trajectories 20 due to the prevailing electric fields, whose field lines are indicated diagrammatically in the left hand part of FIG. 1 by lines 19. As appears from FIG. 1, practically all the ions generated in the beam 6 at the area of the surface 21 are accelerated towards the screen grid 5. All the positive ions generated between the surface 21 in the beam 6 and the cross-over 22 are accelerated practically parallel to the axis 31 of the tube, pass through the opening in the screen grid 5 and strike the cathode 3 in a region which is located radially inwardly of annular emitting part and is indicated in FIG. 2 by broken lines 23. The emission behaviour is therefore not adversely affected thereby; however, it is preferred to provide the semiconductor cathode, as in this case, with an electrode 15, which protects the underlying semiconductor body from charge effects. The electrode 15 is preferably connected to a fixed or a variable voltage.

Positive ions generated at the area of the surface 32 in the beam 6 strike the cathode 3 in the present embodiment outside the region 13 or do not strike the cathode at all, as appears from FIG. 1. With the voltages at the grids 4,5, only a small number of the ions generated at about 100/μm are found to strike the emitting part of the cathode, more particularly the cesium layer, with energies of about 40 eV. This results in only limited sputtering of the cesium while crystal damage is prevented. Depending upon the voltages at the grids 4,5, the distance and energy can still vary slightly.

The sensitivity of the cathode can be reduced still further by subdividing the emitting region 13 into a number of separate regions, as described more fully in the co-pending U.S. patent application Ser. No. 793,886 filed on 1 Nov. 1985. As described in the Patent Application, such a construction moreover favours the stability of the cathode.

Of course, several variations are possible for those skilled in the art without departing from the scope of the invention. For example, several other kinds of semiconductor cathodes may be chosen, such as the already mentioned NEA cathodes or the cathodes described in the British Patent Application No. 8133501 and No. 8133502. Further, instead of circular patterns, for example on behalf of display arrangements, one or more linear patterns may be chosen for the region 13.

What we claimed is:

1. A cathode-ray tube comprising an evacuated envelope containing, along a longitudinal axis of the envelope, an electron-beam-producing means and a target for impingement by the electron beam, said electron-beam-producing means comprising, in succession:

(a) a semiconductor cathode having an electron-emitting region disposed transversely of said axis;

(b) a first electrode disposed adjacent the cathode and having an opening through which the axis passes, said opening extending sufficiently far from said axis to pass electrons emitted from the electron-emitting region of said cathode; and (c) a second electrode positioned relative to the first electrode to cooperate therewith in producing a positive electron lens for converging the emitted electrons into a narrowing electron beam, said second electrode having an opening through which the axis passes, said opening extending sufficiently far from said axis to pass the electron beam but, when viewed in projection along the axis, not extending sufficiently far from said axis to encompass the electron-emitting region of the cathode, said second electrode being configured on a side thereof remote from the first electrode to proximately effect production of electric field lines shaped such that:

(1) near the axis, any positive ions generated in the tube are accelerated substantially parallel to said axis such that ones of said ions passing through the opening in the second electrode miss the electron-emitting region of the cathode; and (2) farther from the axis, positive ions generated in the tube are accelerated away from the axis and the opening in the second electrode.

2. A cathode-ray tube as in claim 1 where the electron-emitting region of the semiconductor cathode is substantially annular and has an inner dimension which is larger than a corresponding dimension of the opening in the second electrode.

3. A cathode-ray tube as in claim 1 where the semiconductor cathode includes a plurality of electron-emitting regions which are uniformly distributed in a substantially annular pattern having an inner diameter which is larger than the corresponding dimension of the opening in the second electrode.

4. A cathode-ray tube as in claim 1 where the semiconductor cathode includes an ion-collecting electrode disposed on a surface thereof encompassed by the opening in the second electrode when said opening is viewed in projection along the axis.

* * * * *